United States Patent [19]

Nishii et al.

[11] Patent Number: 5,052,182
[45] Date of Patent: Oct. 1, 1991

[54] HYDRAULIC BRAKE BOOSTER SYSTEM WITH CHECK VALVE IN BRAKE FLUID RESERVOIR LINE

[75] Inventors: Michiharu Nishii, Toyota; Genji Mizuno, Toyoake; Yoshihiko Tada, Hazu; Yoshihisa Nomura, Toyota; Masahiko Kato, Nagoya; Kenji Shirai, Mishima; Junichi Tanoue, Susono, all of Japan

[73] Assignee: Aisin Seiki Kabushiki Kaisha, Kariya, Japan

[21] Appl. No.: 282,567

[22] Filed: Dec. 12, 1988

[30] Foreign Application Priority Data

Dec. 11, 1987 [JP] Japan .................. 62-314803

[51] Int. Cl.⁵ .................. B60T 13/12; B60T 13/68
[52] U.S. Cl. .................. 60/547.1; 60/562; 60/563; 60/582; 60/585; 303/114; 303/116
[58] Field of Search .................. 60/547.1, 562, 563, 60/585, 589; 303/119, 116, 114

[56] References Cited

U.S. PATENT DOCUMENTS

| | | | |
|---|---|---|---|
| 4,534,171 | 8/1985 | Leiber | 60/563 X |
| 4,641,895 | 2/1987 | Belart et al. | 303/119 |
| 4,728,156 | 3/1988 | Burgdorf et al. | 303/119 X |
| 4,745,750 | 5/1988 | Belart et al. | 60/547.1 |
| 4,749,240 | 6/1988 | Burgdorf | 60/547.1 X |
| 4,761,042 | 8/1988 | Seibert et al. | 303/119 X |
| 4,772,075 | 9/1988 | Wupper et al. | 303/119 X |
| 4,852,352 | 8/1989 | Leigh-Monstevens | 60/585 |

FOREIGN PATENT DOCUMENTS

| | | | |
|---|---|---|---|
| 191662 | 11/1983 | Japan | 60/562 |
| 209948 | 11/1984 | Japan | |
| 227552 | 12/1984 | Japan | |
| 155167 | 7/1987 | Japan | |

Primary Examiner—Edward K. Look
Assistant Examiner—George Kapsalas
Attorney, Agent, or Firm—Burns, Doane, Swecker & Mathis

[57] ABSTRACT

A tandem master brake cylinder has first and second pistons, each piston associated with a fluid chamber and a pressure chamber. The pistons are displaced in response to actuation of a brake pedal. A hydraulic booster is coupled to a power source and is operable to enhance the piston movement and for conducting pressurized fluid to a second of the fluid chambers associated with a second piston to displace that piston in a manner reducing the volume of the pressure chamber associated with the first piston. In the event that a negative pressure is communicated with the second fluid chamber, e.g. by a loss of pressurized fluid from the power source, brake fluid is supplied through a one-way check valve to the second fluid chamber to prevent the negative pressure from reversing the motion of the second piston.

10 Claims, 3 Drawing Sheets

HYDRAULIC BRAKE BOOSTER SYSTEM WITH CHECK VALVE IN BRAKE FLUID RESERVOIR LINE

BACKGROUND OF THE INVENTION

1. Field of the Invention

The present invention relates to a braking system for use in an automotive vehicle and particularly to a hydraulic braking system comprising a tandem master cylinder and a hydraulic booster which outputs hydraulic power pressure supplied from a power source in response to the depression of a brake pedal.

2. Description of the Prior Art

In a conventional braking system for an automotive vehicle, there are provided a plurality of hydraulic circuits connecting wheel brake cylinders with a hydraulic braking pressure generator such as a master cylinder, so that when one of the hydraulic circuits is broken, braking operation is achieved by the rest of the hydraulic circuits. In general, a tandem master cylinder is used in a conventional dual circuit system.

In order to reduce the force required to operate a brake pedal during a braking operation, the hydraulic braking system is provided with a servo unit which is commonly referred to as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such a the master cylinder by the hydraulic power pressure supplied from the power source in response to depression of the brake pedal. For example, the Japanese Patent Laid-open Publication No. 59-209948 has disclosed a system associating the hydraulic booster with the tandem master cylinder which operates as an ordinary tandem master cylinder when the hydraulic booster is not operated.

With employment of such hydraulic booster, it has been proposed to use the hydraulic booster, in the hydraulic braking system, as a dynamic hydraulic pressure generator in addition to the master cylinder. In other words, a hydraulic pressure boosted by the booster (hereinafter referred to as boost pressure) in response to the depression of the brake pedal is applied directly to a hydraulic circuit. For example, as shown in Japanese Patent Laid-open Publication No. 59-227552, boost pressure of the hydraulic booster is applied to rear wheel brake cylinders in a front-and-rear dual circuits system in order to reduce the stroke of the brake pedal. However, if the hydraulic power pressure is lost due to a failure of the operation of the power source, the braking force of the rear wheels disappears, although the braking force of the front wheels can be maintained by the master cylinder.

It is also known from Japanese Laid-open Publication No. 62-155167 that the boost pressure of a hydraulic booster can be transmitted to a pressure chamber of the tandem master cylinder for pressuring certain wheel cylinders. According to such a system, the various effects such as the shortening of the stroke of the brake pedal and so on are obtained. In case of the loss of hydraulic power pressure, the system functions as an ordinary tandem master cylinder and the braking force of all of the wheels can be maintained. In that system, a pressurizing reservoir (e.g., see brake chamber 60 in the publication) having a large capacity is provided, so that enough brake fluid is available when the hydraulic power pressure is not supplied to the second fluid chamber (e.g., see chamber 28 in the publication) of the tandem master cylinder due to the loss of operation of the power source. However, since the second fluid chamber of the tandem master cylinder is communicated with the boost chamber (e.g., see booster operation chamber 88 in the publication) of the hydraulic booster via the pressurizing reservoir, a closed space is formed therein when the communication with the power source is interrupted or the operation of the power source is ceased. Accordingly, since the volume of the boost chamber is expanded by the operation of the hydraulic booster in the above case, the volume of the closed space expands and a negative pressure is generated in that space. This negative pressure results in a decrease of the output hydraulic pressure of the master cylinder and a corresponding loss of the braking force. The occurrence of this phenomenon is especially evident when the brake pedal is depressed many times in a short period. As mentioned above, the pressurizing reservoir is recognized as being effective to compensate for the loss of operation of the power source and so on. However, it is difficult to form such reservoir in the housing.

SUMMARY OF THE INVENTION

It is, therefore, an object of the present invention to ensure the presence of sufficient braking fluid in the second fluid chamber to maintain a stable braking force in case of a failure of the power source, even when pressurized booster fluid is applied to one of the pistons.

It is another object of the present invention to minimize adverse braking action resulting from the generation of negative pressure in a conduit which contains the second fluid chamber and the hydraulic booster.

It is a further object of the present invention to provide an improved hydraulic braking system which includes a tandem master cylinder having a bore with an opening and a closed wall at opposite ends thereof. A first piston is slidably fitted in the bore so as to define a first pressure chamber and a first fluid chamber therein and is operatively connected to a brake pedal. A second piston is slidably fitted in the bore so as to define a second fluid chamber adjacent to the first pressure chamber and a second pressure chamber and is operatively connected to the first piston. Both pressure chambers receive brake fluid from a reservoir through the fluid chambers, respectively, and transmit brake hydraulic pressure when the piston is caused to slide in response to the depression of the brake pedal. A power source generates a hydraulic power pressure. A hydraulic booster boosts the piston action in response to depression of the brake pedal, and also transmits a boost hydraulic pressure to the second fluid chamber. A plurality of wheel cylinders for braking respective road wheels is divided into a first group of wheel brake cylinders communicated with the first pressure chamber through one hydraulic circuit, and a second group of wheel brake cylinders communicated with the second pressure chamber through another hydraulic circuit. Conduit means containing the second fluid chamber and the hydraulic booster is communicated with the reservoir through a check valve.

According to the improved hydraulic braking system including the above structure, when the brake pedal is depressed, the power hydraulic pressure is regulated in response to the depression of the brake pedal and the regulated hydraulic pressure is transmitted to the second fluid chamber. Since brake hydraulic boost pressure is transmitted to the second group of wheel cylinders through the second fluid chamber and the second pressure chamber before the first piston slides, the stroke of the brake pedal is shortened.

Also, when negative pressure is generated in the conduit means connected between the second fluid chamber and the hydraulic booster, e.g., due to a failure of the power source, the check valve means opens so that brake fluid is sucked in from the reservoir. Thus, the brake fluid having a pressure greater than atmospheric pressure will occupy the conduit means to minimize any adverse movement of the second piston. Accordingly, the master cylinder will then be able to operate as a standard non-boosted tandem master cylinder, whereby static hydraulic pressure is applied to all wheels.

BRIEF DESCRIPTION OF THE DRAWINGS

Additional objects and advantage of the present invention will become more apparent from the following detailed description of preferred embodiments thereof when considered with reference to the attached drawings, in which.

DETAILED DESCRIPTION OF THE PREFERRED EMBODIMENTS

A hydraulic braking system in accordance with preferred embodiments of the present invention will be described with reference to the drawings.

Figure 1:
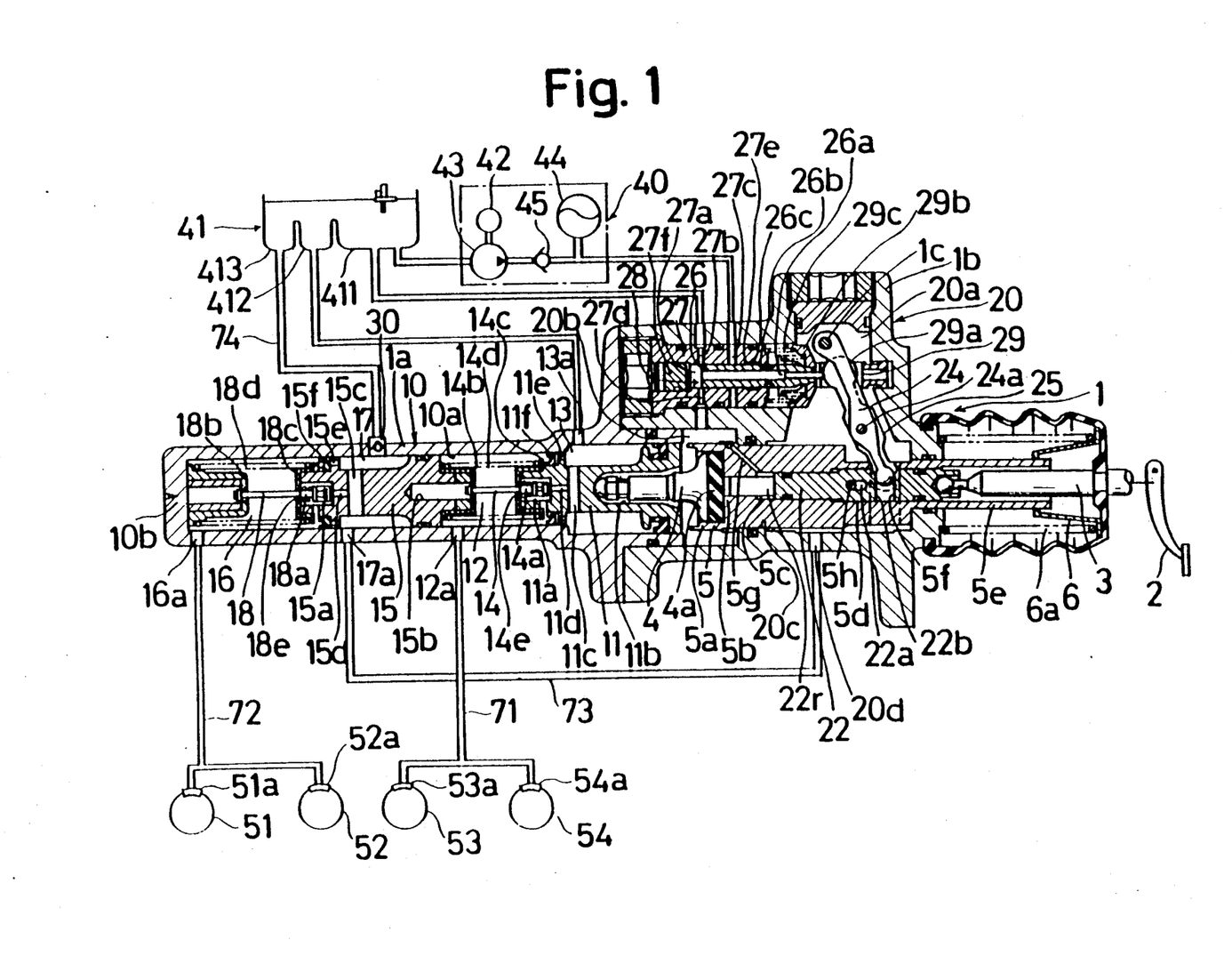
FIG. 1 is a schematic illustration of a hydraulic braking system according to a first embodiment of the present invention, including a longitudinal sectional view through a tandem master cylinder.

Referring to FIG. 1, there is schematically illustrated a hydraulic braking pressure generator 1 which includes a tandem master cylinder 10 and a hydraulic booster 20. As a result, a depression force applied on a brake pedal 2 is transmitted as a brake operating force to an input rod 3. In response to this brake operating force, hydraulic pressure from a power source 40 or a reservoir 41 is appropriately regulated and applied to wheel cylinders 51a and 52a of front wheels 51 and 52 through a first hydraulic passage 72 and to wheel cylinders 53a and 54a of rear wheels 53 and 54 through a second hydraulic passage 71.

The tandem master cylinder 10 includes a housing 1a with a bore 10a. In the bore 10a, a first piston 11 and a second piston 15 are slidably and fluid-tightly fitted. At opposite ends of the first piston 11, there are formed a large-diameter land and a small-diameter land. A right side of the bore 10a is formed into a stepped configuration so as to receive the first piston 11. Between the two lands of the first piston 11, a first fluid chamber 13 is defined in the large-diameter portion of the bore 10a. Between the second piston 15 and the small-diameter land of the first piston 11, a first pressure chamber 12 is defined in the small-diameter portion of the bore 10a. The first pressure chamber 12 is in fluid communication with the first hydraulic passage 71 through a port 12a, and the first fluid chamber 13 is in fluid communication with a second reservoir chamber 412 of the reservoir 41 through a port 13a.

The first piston 11 has holes 11a and 11b extending axially from its opposite ends towards its center, respectively, and a hole 11c formed radially and communicated with the hole 11a through a small hole 11d. The hole 11a opens into the first pressure chamber 12 and the hole 11c opens into the first fluid chamber 13. Axial holes 11e are formed in the small-diameter land of the first piston 11 and a cup seal 11f is fitted on the first piston 11 so as to cover the ends of holes 11e located on the first pressure chamber 12 side. As a result, a check valve is constituted by holes 11e and cup seal 11f. A valve member 14a mounted on a right end of a valve rod 14 is movably received in the hole 11a of the first piston 11 in opposing relation to the small hole 11d, and the valve member 14a is restricted from moving towards the second piston 15 by a retainer 14c mounted on the first piston 11. A large-diameter end portion of a left end of the valve rod 14 is movably received in a hole 15b formed in the second piston 15 and is restricted from moving towards the first piston 11 by a retainer 14b mounted on a right end of the second piston 15. A spring 14e is disposed between the retainer 14c and the valve rod 14 so as to urge the valve member 14a towards the small hole 11d. A head portion of the input rod 4 is received in the hole 11b.

A return spring 14d is disposed between the retainer 14c and the retainer 14b so as to continually urge the first piston 11 and the second piston 15 away from each other. Thus, the opposite ends of the valve rod 14 are normally in engagement with the respective retainers 14b and 14c. Therefore, the valve 14a and the small hole 11d are spaced from each other, and brake fluid supplied from the reservoir 41 to the first fluid chamber 13 through the port 13a enters the first pressure chamber 12 through the hole 11e or the holes 11c, 11d, and 11a. Thus, when the first piston 11 is moved towards the second piston 15 against the urging force of the return spring 14d, the cup seal 11f and the valve member 14a close the hole 11e and hole 11d, respectively so that the first pressure chamber 12 is held in the closed state except for the port 12a. Accordingly, the pressure of the brake fluid is raised in response to movement of the first piston 11.

The second piston 15 is disposed between a closed wall 10b at a left end of the bore 10a and the first piston 11 and is slidably and fluid-tightly fitted into the bore 10a similar to the first piston 11. At the ends of the second piston 15, a pair of small-diameter lands are formed thereon, and a second fluid chamber 17 is defined between those lands, and a second pressure chamber 16 is defined between the second piston 15 and the closed wall 10b. The second pressure chamber 16 is in fluid communication with the second hydraulic passage 72 through a port 16a, and the second fluid chamber 17 is in fluid communication with the third hydraulic passage 73 through a port 17a.

Similar to the first piston 11, the second piston 15 has axial holes 15a, 15b and a radial hole 15c. The hole 15a is in fluid communication with the hole 15c through the axial small hole 15d. Axial holes 15e are formed in the land on the second pressure chamber 16 side of the second piston 14, and a cup seal 15f is fitted on the second piston 15 so as to cover the ends of holes 15e on the second pressure chamber 16 side. As a result, a check valve is constituted by holes 15e and the cup seal 15f. A valve member 18a mounted on a right end of a valve rod 18 is movably received in the hole 15a of the second piston 15 in opposing relation to the small hole 15d, and the valve member 15a is restricted from moving towards the closed wall 10b by a retainer 18c mounted on the second piston 15. A large diameter end portion of a left end of the valve rod 18 is movably received in a retainer 18b and is restricted from moving towards the first piston 11 by a retainer 18b mounted on a right end of the second piston 15. A spring 18e is disposed between the retainer 18c and the valve rod 18 so as to urge the valve member 18a towards the small hole 15d. A return spring 18d is disposed between the retainer 18b and the retainer 18c so as to space the second piston 15 from the closed wall 10b. Thus, the valve member 18a is located away from the hole 18d under normal conditions.

When the hydraulic booster 20 which will be detailed later supplies output pressure into the second fluid chamber 17 through the third hydraulic passage 73 and the port 17a, the output pressure is transmitted to the second pressure chamber 16 through the hole 15e or the small hole 15d and the hole 15a. At the same time, an urging force towards the first piston 11 is applied to the land of the second piston 15 located at the first pressure chamber 12 side, whereupon the second piston 15 slides towards the first piston 11.

When no output pressure from the hydraulic booster 20 is present in the third hydraulic passage 73, and when the first piston 11 is moved towards the second piston 15, the volume of the first pressure chamber 12 is decreased thereby increasing the pressure therein, and the second piston 15 is moved toward the wall 10b against the urging force of the return spring 18d. Thus, the small holes 11d and 15d are closed fluid tightly by the valve members 14a, 18a, respectively, thereby increasing the pressure of the brake fluid in both pressure chambers 12 and 16.

At the second fluid chamber 17, a check valve 30 is provided and the second fluid chamber 17 is in fluid communication with a third reservoir chamber 413 of the reservoir 41 via a fourth hydraulic passage 74. This check valve 30 allows a flow of brake fluid from the reservoir 41 to the second fluid chamber 17 and prevents flow in the reverse direction. That is, the check valve 30 communicates the second fluid chamber 17 with the reservoir 41 when the hydraulic pressure in the second fluid chamber 17 becomes low compared with the brake hydraulic pressure (atmospheric pressure) in the reservoir 41 and prevents communication in any other condition.

Figures 2, 3:
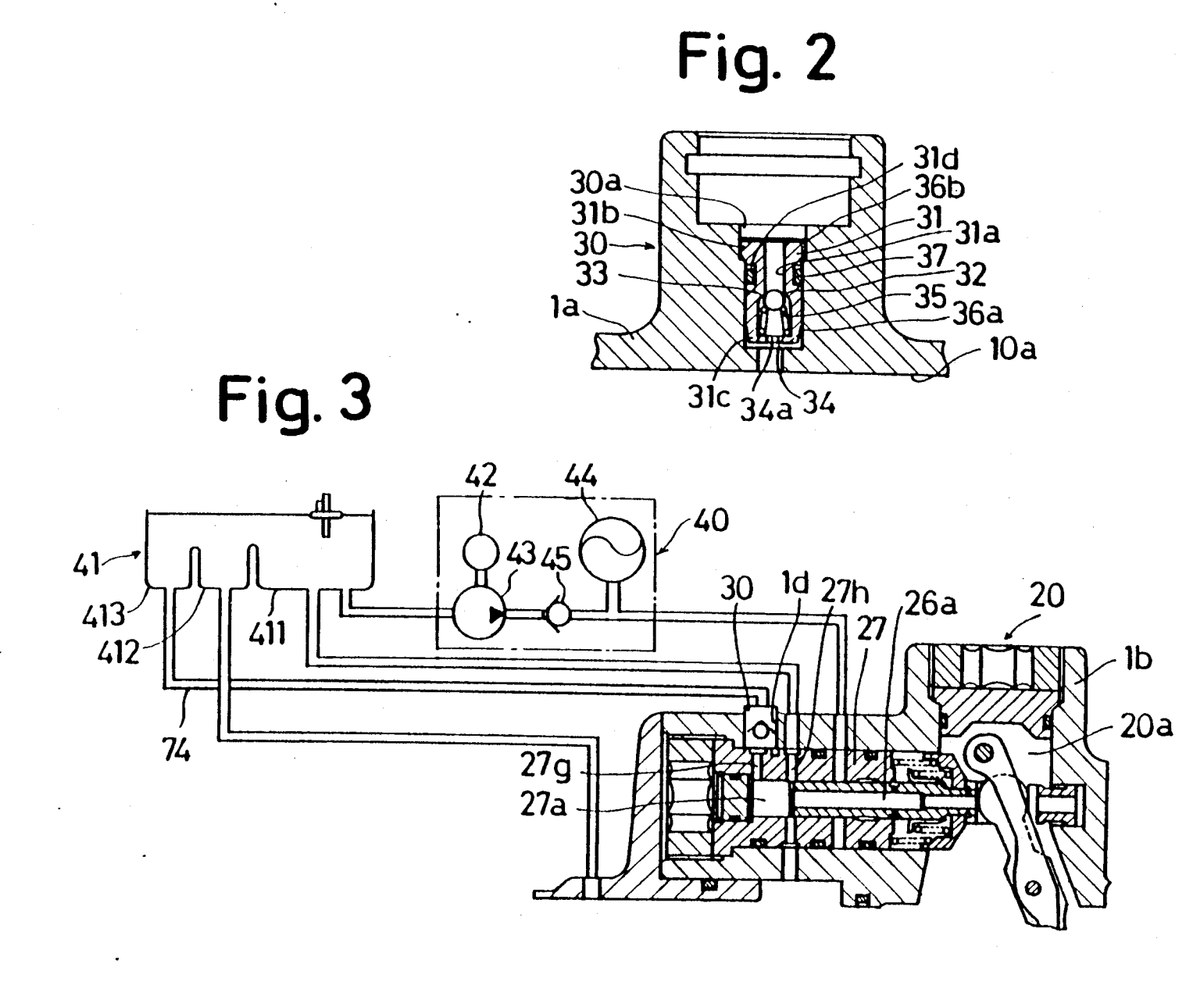
FIG. 2 is a partial enlarged longitudinal sectional view through a check valve of the first embodiment.
FIG. 3 is a longitudinal sectional view through a fragment of a hydraulic braking system according to a second embodiment of the present invention.

FIG. 2 is a cross sectional view of the check valve 30, the check valve 30 being fitted and fixed into a stepped port 30a formed in the housing 1a. Namely, a valve case 31 which is of generally cylindrical shape has a stepped hole 31a formed centrally therein in the axial direction. A flange portion 31b at one end of the case 31 is fitted into the stepped port 30a, and a tip portion 31c of the valve case 31 is engaged by a stop ring 36a. The flange portion 31b of the case 31 is engaged by a stop ring 36b at a large-diameter portion of the stepped port 30a. Thus, the valve case 31 is fixed in the stepped port 30a against movement in the axial direction. In the tip portion of the valve case 31, a retainer 34 is provided having a communication hole 34a at its center. Further, in a large-diameter portion of the stepped hole 31a of the valve case 31, a valve member 32 is received so as to be contactable with a valve seat 33 formed on a surface of the large-diameter portion of the stepped hole 31a and is urged toward the valve seat 33 by a spring 35 supported by the retainer 34. Also, in an outer circumference of the center of the valve case 31, a seal groove 31d is formed, and a seal member 37 is fitted into the seal groove 31d. Accordingly, in this check valve 30, the valve member 32 normally seats on the valve seat 33 and closes the stepped port 30a. When the brake fluid pressure in the second fluid chamber 17 becomes lower than the brake fluid pressure in the reservoir 41, the valve member 32 moves toward the retainer 34 against the urging force of the spring 35 and separates from the valve seat 33 to open the stepped port 30a.

Next, the hydraulic booster 20 is described below together with a braking force input mechanism.

In a housing 1b joined with the housing 1a, a boost chamber 20a and a low-pressure chamber 20b of the hydraulic booster 20 are defined, and a power piston 5 is fluid-tightly and slidably disposed in a bore 20c which is substantially coaxial with the cylinder bore 10a. The power piston 5 is provided with a retainer 6 at its end extending toward the brake pedal 2, and a spring 6a is mounted between the retainer 6 and the housing 1b so as to normally urge the power piston 5 toward the brake pedal 2. The power piston 5 has at its longitudinal middle portion a shoulder portion which abuts the housing 1b to restrict the power piston 5 from sliding toward the brake pedal 2.

In the power piston 5, a recess 5a is formed at the end facing the first piston 11, and a stepped bore is formed axially in the center. This stepped bore comprises a small diameter bore 5b, an intermediate-diameter bore 5c, a large-diameter bore 5d and an open end bore 5e. In the stepped bore, received slidably are a reaction rod 22r received in the small-diameter bore 5b, and a reaction piston 22 which has a small-diameter portion received in the intermediate-diameter bore 5c and a large-diameter portion received in the large-diameter bore 5d. The axial length of the reaction rod 22r is larger than the length of the small-diameter bore 5b of the stepped bore. Formed in the reaction piston 22 are an elongated hole 22a extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restricted from sliding at least toward the brake pedal 2 with respect to the power piston 5.

The large-diameter portion of the reaction piston 22 is provided with a recess at its end. One end of an input rod 3 is connected to the brake pedal 2, and the other end of the input rod 3 is provided with a spherical head which is inserted in the open end bore 5e of the power piston 5 and received in the recess of the reaction piston 22. Formed radially in the power piston 5 is a through-hole 5f which is aligned with the through-hole 22b when the reaction piston 22 is positioned most closely to the brake pedal 2 and which is larger in diameter than the through-hole 22b.

Between the intermediate-diameter bore 5c and the reaction rod 22r, an annular space is defined due to the difference in axial length between the reaction rod 22r and the small-diameter bore 5b, that space communicating with the low-pressure chamber 20b through an inclined hole 5g. The large-diameter end portion of the output rod 4 is received in the recess 5a of the power piston 5 via an elastic reaction disk 4a and is held in the recess 5a by suitable means, such as under the urging of a leaf spring for instance. There exists normally a gap between the reaction disk 4a and the end of the reaction rod 22r. The output rod 4 is disposed in the hole 11b of the first piston 11, and the head of the output rod 4 is in contact with the bottom surface of the hole 11b.

A support lever 24 is pivotally connected at one of its ends to the housing 1b by a pin 1c for pivotal movement within the boost chamber 20a, and a spherical head on the other end of the support lever 24 is fitted into the through-hole 22b of the reaction piston 22. A control lever 25 is pivotally connected with the support lever 24 by a pin 24a approximately in its center, and one head of the control lever 25 is fitted into the through-hole 5f of the power piston 5. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the pin 1c. At this time, since a lower head of the control lever 25 is retained in the through-hole 5f of the power piston 5, the upper head of the control lever 25 is rotated counterclockwise about the pin 24a and hence moved in the sliding direction of the reaction piston 22. As a result, the upper head of the control lever 25 is displaced in response to movement of the reaction rod 22r until the rod 22r comes into contact with the reaction disk 4a.

The housing 1b has a spool-valve bore extending substantially in parallel with the power piston 5 and communicating with the boost chamber 20a, and a spool valve 28 is fitted into the spool-valve bore. The spool valve 28 includes a cylinder 27 and a spool 26 slidably received in a spool bore 27a formed in the cylinder 27 substantially in parallel with the power piston 5, and one end of the spool bore 27a is fluid-tightly plugged by a closure member 27f. Formed axially in the spool 26 is a through-hole 26a, and formed radially is a hole 26b communicating with the through-hole 26a. One end of the spool 26 is positioned in the boost chamber 20a and is connected to one end of a control rod 29. The other end of the control rod 29 is slidably mounted in a recess formed in the housing 1b, and the upper head of the control lever 25 is fitted into a through-hole 29a radially bored in the control rod 29. Between the cylinder 27 and a retainer 29b formed at one end of the control rod 29, a spring 29c is mounted so as to normally urge the spool 26 toward the control lever 25. The through-hole 26a normally opens to the boost chamber 20a at the junction of the spool 26 and the control rod 29.

When the control lever 25 is in its initial position, the through-hole 26a of the spool 26 is communicated with the first reservoir chamber 411 of the reservoir 41 and the low-pressure chamber 20b through a hole 27b radially bored in the cylinder 27, a hole 27d communicating with the hole 27b via the peripheral groove formed around the outer surface of the cylinder 27, and the corresponding ports formed in the housing 1b. Thus, the boost chamber 20a is also communicated with the first reservoir chamber 411 of the reservoir 41 via through-hole 26a and hole 26b and is filled with brake fluid under atmospheric pressure. A hole 27c communicating with the power source 40 is formed in the cylinder 27 at a predetermined distance from the hole 27b toward the control rod 29. The hole 27c is normally closed by the peripheral surface of the spool 26. Between the hole 27c and the end of the spool 26 facing the control rod 29, an annular groove 27e is formed on the inner surface of the cylinder 27, and an annular groove 26c is formed on the peripheral surface of the spool 26 in opposing relation to the annular groove 27e.

When the spool 26 is moved toward the closure member 27f in response to the movement of the control lever 25, the hole 27b of the cylinder 27 is closed. The hole 27c, in turn, faces the annular groove 26c of the spool 26, and the annular groove 27e faces the annular groove 26c and the hole 26b. Consequently, the hole 27c is communicated with the through-hole 26a. Accordingly, the hydraulic power pressure of the power source 40 is introduced into the boost chamber 20a to increase the hydraulic pressure therein, and the reaction force is thereby transmitted to the brake pedal 2 via the reaction piston 22, and at the same time the raised hydraulic pressure is applied to the first piston 11 via the power piston 5. The power piston 5 moves toward the left until the pin 5h comes into contact with the elongated hole 22a of the reaction piston 22. Thus, the relative position of the control lever 25 and the support lever 24 becomes similar to that of the initial state. Accordingly, the control lever 25 is moved clockwise about the pin 24a to retract the control rod 29 to the right. The hole 27c of the cylinder 27 is thereby closed, and in turn the hole 27b is communicated with the hole 26a of the spool 26 to lower the hydraulic pressure in the boost chamber 20a so that the power piston 5 is moved toward the brake pedal 2. With this operation performed repeatedly, the hydraulic pressure within the boost chamber 20a is regulated to a predetermined boost pressure. Also, a port 20d which is formed in the housing 1b so as to communicate with the boost chamber 20a is in fluid communication with the second fluid chamber 17 of the tandem master cylinder 10 via the third hydraulic passage 73 and the port 17a. Accordingly, the output hydraulic pressure of the boost chamber 20a is supplied to the second fluid chamber 17.

The power source 40 comprises an accumulator 44 for generating a hydraulic power pressure along with a fluid pump 43 which is connected to the accumulator 44 via check valve 45 and connected to the reservoir 41 which stores an amount of hydraulic fluid. The power source 40 is arranged to supply the power hydraulic pressure to the necessary regions via the accumulator 44. The fluid pump 43 is operated by a motor 42 which is actuated by an electric control signal from an electric control device (not shown). Namely, the power hydraulic pressure is maintained at a predetermined value by means of an intermittent controlled of the motor by the electric control device in response to the electric control signal from a pressure sensor (not shown).

Also, the reservoir 41 is divided into three chambers, namely, the first reservoir chamber 411 communicated with the power source 40 and the hydraulic booster 20, the second reservoir chamber 412 communicated with the first fluid chamber 13 and the third reservoir chamber 413 communicated with the second fluid chamber 17 via the fourth hydraulic passage 73 and the check valve 30. These three reservoir chambers are communicated with each other at their upper ends, i.e., only in the region of the fluid surface, so that the necessary brake fluid quantity in each reservoir chamber is not influenced by a change of the other reservoir chamber.

The above-described embodiment of the hydraulic braking system 1 operates as follows. FIG. 1 shows a condition under which the brake pedal 2 is not depressed. In this condition, the first fluid chamber 13 which is communicated with the reservoir 41 is in fluid communication with the first pressure chamber 12 which is communicated with the wheel cylinders 53a and 54a of the rear wheels 53 and 54; thus the brake fluid contained therein is under the pressure in the reservoir 41, namely atmospheric pressure.

The power hydraulic pressure of the power source 40 is supplied to the hole 27c. But, in this condition, since the hole 27c is shut, the hydraulic booster 20 is not operated.

Also, since the brake fluid in the second pressure chamber 16 and the second fluid chamber 17 is in fluid communication with atmospheric pressure in the reservoir 41 via the port 17a, the third hydraulic passage 73, the port 20d, the boost chamber 20a and the hole 27b the brake fluid in the wheel cylinders 51a and 52a (which is communicated with the second pressure chamber 16 via the port 16a and the second hydraulic passage 72) is also at atmospheric pressure.

When the brake pedal 2 is depressed, the reaction piston 22 is pushed via the input rod 3 until the reaction rod 22r abuts the reaction disk 4a of the power piston 5. Accordingly, the control lever 25 is rotated counterclockwise relative to the support lever 24 about the axis of the pin 24a so that the head of the control lever 25 pushes the spool 26 to the left. Thus, the hydraulic pressure from the power source 40 is introduced into the boost chamber 20a to push the power piston 5 to the left to apply the boost force to the first piston 11 with the reaction force transmitted to the brake pedal 2 via the reaction piston 22. At the same time, the hydraulic pressure is supplied from the port 20d to the second fluid chamber 17 via the third hydraulic passage 73, and from the second fluid chamber 17 to the second pressure chamber 16 via the small hole 15d and the hole 15e. From the pressure chambers 17, 16 the pressure is supplied to the wheel cylinders 51a and 52a via the second hydraulic passage 72.

Also, the second piston 15 is forced to slide toward the first piston 11 against the return spring 14d by the hydraulic pressure introduced into the second fluid chamber 17. This causes the valve rod 14 to become separated from the retainer 14b and move toward the small hole 11d by the spring 14e, so that the valve member 14a closes the small hole 11d fluid-tightly. As a consequence of the motion of the piston 15 toward the piston 11, the volume of chamber 12 is reduced. Thus, there will remain no voids in the hydraulic passage 71 and wheel cylinders 53a, 54a, so that hydraulic braking pressure is transmitted to the wheel cylinders 53a and 54a as soon as the first piston 11 is caused to slide by the power piston 5. Meanwhile, in the boost chamber 20a, the hydraulic pressure is kept at the predetermined boost pressure since the spool valve 28 will be operated by the control lever 25 in response to relative displacement of the power piston 5 as explained earlier herein.

As will be appreciated from the foregoing explanation, since the brake hydraulic pressure is transmitted to the wheel cylinders 51a and 52a by the hydraulic booster 20 before the first piston 11 slides, the stroke of the brake pedal 2 is shortened, and since the valve member 14a closes the small hole 11d in response to the movement of the second piston 15 toward the first piston 11 before the first piston 11 slides, no idle (non-working) stroke of the first piston 11 will occur since the movement of the second piston 15 eliminates all voids in the first pressure chamber 12. Further, the brake fluid of first stage fills the hydraulic circuit communicated with the first pressure chamber 12 in response to the decrease of the volume of the first pressure chamber 12 produced by the sliding of the second piston 15; hence, the stroke of the brake pedal 2 required to decrease of the volume of the first pressure chamber 12 is reduced. Thus, the increasing of the brake hydraulic pressure occurs rapidly whereby the magnitude of the braking force with respect to the magnitude of the stroke of the brake pedal 2 is a linear relationship. Also, in the event that the operation of the power source ceases and the power pressure is lost, a negative pressure will be generated in the boost chamber 20a and the second chamber 17 since the volume of the boost chamber 20a is expanded by the sliding of the power piston 5 in response to the operation of the brake pedal 2. However, this causes the check valve 30 to be opened, whereupon the second fluid chamber 17 (which defines a fluid conduit together with the hydraulic booster 20) is communicated with the third reservoir chamber 413 of the reservoir 41 via the fourth hydraulic passage 74. Therefore, the necessary brake fluid is supplied to the second fluid chamber 17, and the hydraulic pressure of the brake fluid in the second fluid chamber 17 is controlled to about atmospheric pressure without the generation of a negative pressure therein. Accordingly, the boost function of the hydraulic booster 20 ceases, but in the tandem master cylinder 10, since the hydraulic pressure in the first pressure chamber 12 is increased (by the sliding movement of the first piston 11 in response to the depression of the brake pedal 2) and the hydraulic pressure in the second pressure chamber 16 is increased (by the sliding movement of the second piston 15 due to the increase of pressure in the first pressure chamber 12), the system operates as an ordinary tandem master cylinder having a stable braking force.

As mentioned above, in this embodiment, since the hydraulic braking system operates the same as an ordinary tandem master cylinder when the hydraulic pressure of the power source 40 has been lost, the first hydraulic passage 71 and the second hydraulic passage 72 defining the two hydraulic circuits can be connected individually to the front-rear wheels without the need for a more complicated hook-up.

FIG. 3 shows a second embodiment of the present invention. In FIG. 3, the same parts as compared with FIG. 1 are identified by the same reference numerals as in FIG. 1. The main difference between FIG. 1 and FIG. 3 is that the fourth hydraulic passage 74 extends to the hydraulic booster portion of the fluid conduit defined by the booster and the second fluid chamber 17, and that the check valve 30 is provided in the hydraulic booster 20. Namely, the check valve 30 is fitted and fixed into a port 1d formed in the housing 1b. Thus, the third reservoir chamber 413 of the reservoir 41 is communicated with the boost chamber 20a via the fourth hydraulic passage 74, the check valve 30, the hole 27g formed in the housing 1b, the spool bore 27a and the through-hole 26a. Now, in this embodiment, since the operation is same as the operation of the embodiment shown in FIG. 1, a detailed description is unnecessary.

Figure 4:
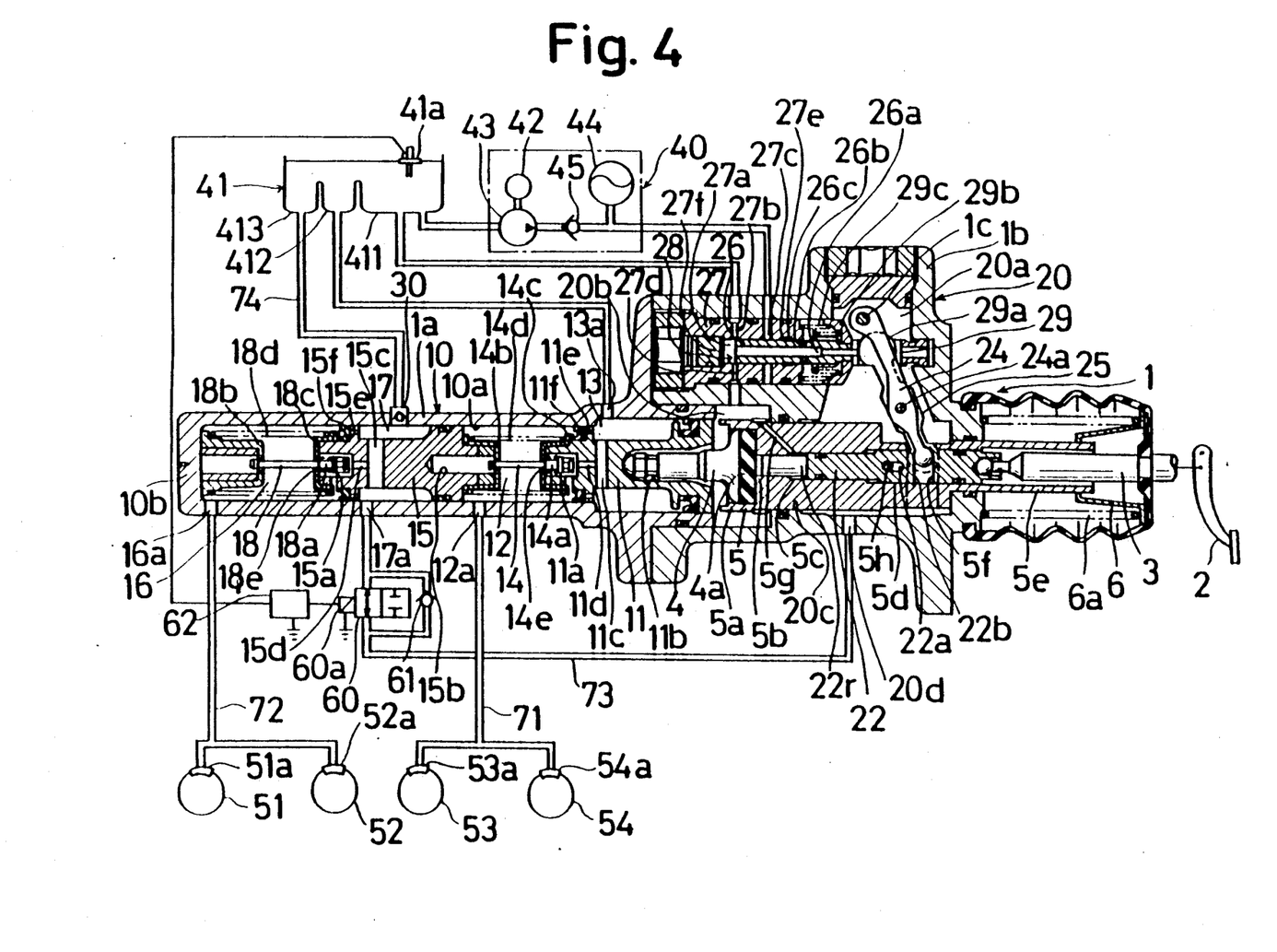
FIG. 4 is a view similar to FIG. 1 of a hydraulic braking system according to a third embodiment of the present invention.

FIG. 4 shows a third embodiment of the present invention. In FIG. 4, the same parts as compared with FIG. 1 are identified by the same reference numerals utilized in FIG. 1. The main difference between FIG. 1 and FIG. 4 is that a cut-off valve 60 is disposed in the third hydraulic passage 73, and check valve 61 is disposed in the third hydraulic passage 73 in a line disposed parallel with the cut-off valve 60.

The cut-off valve 60 is a two port-two position solenoid operated directional control valve arranged for opening or closing the third hydraulic passage 73 upon energization of a solenoid coil 60a by a relay 62 controlled in response to the electric output signal from a fluid sensor 41a provided in the reservoir 41. The cut-off valve 60 is constituted as a normal open valve in this embodiment. Accordingly, the boost chamber 20a is normally in fluid communication with the second fluid chamber 17. When an insufficiency of brake fluid is detected by the fluid measure sensor 41a, the relay 62 is operated and the solenoid coil 60a is energized to close the third hydraulic passage 73. Alternatively, the cut-off valve 60 may function such that the closing of the valve requires an energization of the solenoid. Also, the cut-off valve 60 may be operated in response to a pressure sensor (not shown) which detects the output hydraulic pressure of the power source 40 instead of the fluid quantity sensor 41a. The check valve 61 functions to accelerate the return of the brake fluid from the second fluid chamber 17 to the boost chamber 20a of the hydraulic booster 20 under the opening condition of the cut-off valve 60.

When the output hydraulic pressure of the hydraulic booster 20 has been lost, the valve member 18a closes the small hole 15d by the sliding movement of the second piston 15 due to the brake pressure of the first pressure chamber 12, and then the brake pressure of the second pressure chamber 16 is increased and the operation of the system as an ordinary tandem master cylinder is ensured, as in the first embodiment. When the brake fluid level in the reservoir 41 lowers so that an electric output signal from the fluid measure sensor 41a is generated, the relay 62 is operated and the cut-off valve 60 is closed. However, if there has occurred not only a loss of output hydraulic pressure of the hydraulic booster 20, but also a lowering of the output hydraulic pressure of the hydraulic booster 20 to a valve below the hydraulic pressure in the second fluid chamber 17, the brake fluid in the second fluid chamber 17 flows to the hydraulic booster 20 through the check valve 61. In the absence of the check valve, the necessary brake fluid would be unavailable when the volume of the second pressure chamber 16 is expanded. But in this embodiment, in the first embodiment shown in FIG. 1, the necessary brake fluid measure is supplied from the third reservoir chamber 413 of the reservoir 41 to the second fluid chamber 17 via the check valve 30, so that the fourth hydraulic passage 74 and the second fluid chamber 17 is maintained at about atmospheric pressure.

When a leakage of the brake fluid occurs in a hydraulic circuit including the wheel cylinders 51a and 52 of front wheels 51 and 52, the brake fluid level in the reservoir 40 is decreased and a signal from the fluid measure sensor 41a is generated. In response, the cut-off valve 60 is closed. In this case, too, as mentioned above, the brake fluid is supplied to the second fluid chamber 17 via the check valve 30. However, the outflow of the brake fluid is restricted to the third reservoir chamber 413 of the reservoir 41, so that the presence of sufficient brake fluid in the first and second reservoir chambers 411, 412 is ensured.

Accordingly, an outflow of the boost pressure to the hydraulic circuit communicated with the second pressure chamber 16 is prevented and the braking force is operated at the rear wheels 53 and 54 during operation of the hydraulic booster 20. Now, since the remaining structure, operation and the effect of FIG. 4 are as same as in the first embodiment shown in FIG. 1, no further explanation is necessary.

As mentioned above, according to the present invention, as to the hydraulic circuit communicated with the second pressure chamber of the tandem master cylinder, the stroke of the brake pedal is shortened since the output pressure of the hydraulic booster is transmitted to the second fluid chamber of the tandem master cylinder, (the second piston does not slide after the first piston slides). Further, the need to reduce the volume of the pressure chamber is fulfilled by the sliding movement of the second piston toward the first piston during the first stage of the depression of the brake pedal, rather than be fulfilled by a sliding of the first piston. Thus, it is possible to shorten the stroke of the brake pedal.

Further, according to the present invention, in case negative pressure is generated in the second fluid chamber due to a stopping of the operation of the power source, the second fluid chamber is communicated with the reservoir via the check valve. Thus, since the second fluid chamber is maintained at about atmospheric pressure and sufficient brake fluid is supplied to the second fluid chamber, it is ensured that a stable braking force will occur without the creation of either: (i) a shortage of brake fluid for the subsequent brake releasing operation or (ii) an excessive loss of braking force by the negative pressure. Moreover, due to the use of a check valve, it is not necessary to form the pressurizing reservoir in the master cylinder as shown in the prior art. Thus, the invention can be easily incorporated in an existing hydraulic braking system.

Although certain specific embodiments of the present invention have been shown and described it is apparent that many modifications thereof are possible. The present invention, therefore, is not intended to be restricted to the exact showing of the drawings and description thereof, but is considered to include reasonable and obvious equivalents thereof.

We claim:

1. A hydraulic braking system for braking the wheels of a vehicle, comprising:
   first and second groups of brake cylinders operably connected with respective wheels,
   reservoir means containing brake fluid,
   fluid pressurizing means fluidly connected with said reservoir means for defining a source of pressurized brake fluid,
   a tandem master cylinder comprising:
   a housing having a bore therein, one end of said bore being open and the other end thereof being closed, and
   piston means slidably disposed in said bore and defining with said housing first and second pressure chambers and first and second fluid chambers, said piston means comprising first and second pistons mounted for relative sliding movement in said bore, said first and second fluid chambers being in fluid connection with said first and second pressure chambers, respectively, for supplying brake fluid to said first and second pressure chambers, said first and second pressure chambers being fluidly connected with said first and second groups of brake cylinders, respectively,
   means for imparting sliding motion to said piston means in a manner pressurizing brake fluid in said first and second pressure chambers, comprising:

a brake pedal operably connected to said piston means through said open end of said bore for imparting sliding motion to said piston means when said pedal is actuated, and a hydraulic booster fluidly connected to said source of pressurized fluid and operably connected to said brake pedal for applying pressurized brake fluid to said piston means in response to actuation of said brake pedal to boost the sliding motion of said piston means, said hydraulic booster, during all braking operations, being continually fluidly connected to said second fluid chamber for supplying pressurized brake fluid to the second fluid chamber in response to actuation of said brake pedal for boosting the fluid pressure in said second fluid chamber, and fluid conduit means fluidly connecting said reservoir means and said second fluid chamber, said fluid conduit means including valve means permitting the flow of brake fluid from said reservoir means to said second fluid chamber when negative pressure is generated in said second fluid chamber and preventing the flow of brake fluid from the second fluid chamber to said reservoir means.

2. A hydraulic braking system according to claim 1, wherein said valve means comprises a one-way check valve.

3. A hydraulic braking system according to claim 2, wherein said hydraulic booster comprises a booster chamber communicating with said piston means, an input rod slidably disposed in said booster chamber and operably connected to said brake pedal to be moved in response to actuation of said brake pedal, a control valve operably connected to said input rod and to said source of pressurized fluid for admitting pressurized fluid into said booster chamber in response to actuation of said brake pedal.

4. A hydraulic braking system according to claim 2, wherein said reservoir means comprises three reservoir chambers communicating with one another in the region of a surface of fluid contained therein, a first of said reservoir chambers communicating with said fluid pressurizing means, a second of said reservoir chambers communicating with said first fluid chamber, and a third of said reservoir chambers communicating with said fluid conduit means.

5. A system according to claim 1, wherein said fluid conduit means extends from said reservoir means to said second fluid chamber.

6. A system according to claim 5, wherein said valve means comprises a one-way check valve mounted in said housing.

7. A system according to claim 1, wherein said fluid conduit means extends from said reservoir means to said hydraulic booster.

8. A system according to claim 7, wherein said hydraulic booster includes a portion of said housing, said valve means comprising a one-way check valve mounted in said portion of said housing.

9. A hydraulic braking system for braking the wheels of a vehicle, comprising:

first and second groups of brake cylinders operably connected with respective wheels, reservoir means containing brake fluid, fluid pressurizing means fluidly connected with said reservoir means for defining a source of pressurized brake fluid, a tandem master cylinder comprising:

a housing having a bore therein, one end of said bore being open and the other end thereof being closed, and piston means slidably disposed in said bore and defining with said housing first and second pressure chambers and first and second fluid chambers, said piston means comprising first and second pistons mounted for relative sliding movement in said bore, said first and second fluid chambers being in fluid connection with said first and second pressure chambers, respectively, for supplying brake fluid to said first and second pressure chambers, said first and second pressure chambers being fluidly connected with said first and second groups of brake cylinders, respectively, means for imparting sliding motion to said piston means in a manner pressurizing brake fluid in said first and second pressure chambers, comprising:

a brake pedal operably connected to said piston means through said open end of said bore for imparting sliding motion to said piston means when said pedal is actuated, and a hydraulic booster fluidly connected to said source of pressurized fluid and operably connected to said brake pedal for applying pressurized brake fluid to said piston means in response to actuation of said brake pedal to boost the sliding motion of said piston means, detecting means for detecting an insufficiency of brake fluid in said reservoir means, said hydraulic booster, during all braking operations, being continually fluidly connected to said second fluid chamber, except when said detecting means detects an insufficiency of brake fluid in said reservoir means, for supplying pressurized brake fluid to the second fluid chamber in response to actuation of said brake pedal for boosting the fluid pressure in said second fluid chamber, and fluid conduit means fluidly connecting said reservoir means and said second fluid chamber, said fluid conduit means including valve means permitting the flow of brake fluid from said reservoir means to said second fluid chamber when negative pressure is generated in said second fluid chamber and preventing the flow of brake fluid from the second fluid chamber to said reservoir means.

10. A hydraulic braking system according to claim 9, wherein said hydraulic booster is fluidly connected to said second fluid chamber by way of a hydraulic passage, and wherein said detecting means includes a fluid sensor for sensing the fluid in said reservoir means, and including a cut-off valve for closing said hydraulic passage in response to a signal from said fluid sensor indicating insufficient fluid availability, and a bypass arranged in parallel with said cut-off valve and including a check valve permitting fluid flow toward said hydraulic booster.

* * * * *